United States Patent
Girzone et al.

(10) Patent No.: US 6,836,609 B2
(45) Date of Patent: Dec. 28, 2004

(54) GAS BLOCKING DEVICE FOR OPTICAL FIBER REPEATER

(75) Inventors: William Girzone, Bradley Beach, NJ (US); Maurice Kordahi, Atlantic Highlands, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/770,003

(22) Filed: Jan. 25, 2001

(65) Prior Publication Data

US 2002/0097976 A1 Jul. 25, 2002

(51) Int. Cl.[7] .................................................. G02B 6/00
(52) U.S. Cl. ...................... 385/138; 385/137; 385/139; 385/115; 385/147
(58) Field of Search .............................. 385/138, 137, 385/139, 115, 147

(56) References Cited

U.S. PATENT DOCUMENTS

| | | | |
|---|---|---|---|
| 4,119,363 A | 10/1978 | Camlibel et al. | |
| 4,312,563 A | 1/1982 | Mead | |
| 4,345,816 A | 8/1982 | Nakai et al. | ................ 350/96.2 |
| 4,657,346 A | 4/1987 | Berry et al. | |
| 4,707,066 A | * 11/1987 | Falkenstein et al. | ........ 385/138 |
| 4,834,479 A | 5/1989 | Adl | ............................ 350/96.2 |
| 5,024,503 A | 6/1991 | Gunn et al. | ................. 350/96.2 |
| 5,157,753 A | * 10/1992 | Rogers, Jr. | .................... 385/115 |
| 5,613,031 A | * 3/1997 | Tanabe et al. | .............. 385/138 |
| 5,644,673 A | * 7/1997 | Patterson | ..................... 385/138 |
| 5,956,443 A | 9/1999 | Carberry et al. | .............. 385/43 |

FOREIGN PATENT DOCUMENTS

FR         2546308        11/1983

* cited by examiner

*Primary Examiner*—Tarifur R. Chowdhury
*Assistant Examiner*—George Y. Wang

(57) ABSTRACT

A gas blocking device is used in an optical fiber repeater or other device to prevent the passage of gas, for example, to prevent nitrogen from escaping from a pressurized housing through a fiber holding tube or pigtail. The gas blocking device includes a fiber containing body, a fiber organizing insert, and a locking member securing the insert to one end of the body. The fiber containing body is attached to one end of the fiber holding tube. The fibers extend from the fiber holding tube through a passageway in the body, and each of the fibers extends through a fiber receiving hole in the fiber organizing insert. The insert engages the body such that the insert is prevented from rotating with respect to the body and the fibers are protected against microbending and other damage. A material, such as hot melt glue, fills at least a portion of the body and surrounds the fibers to block the gas from entering the fiber holding tube.

14 Claims, 4 Drawing Sheets

GAS BLOCKING DEVICE FOR OPTICAL FIBER REPEATER

TECHNICAL FIELD

The present invention relates to fiber optic systems and, more particularly, to a gas blocking device used to permit the passage of optical fibers while preventing the passage of gas therethrough.

BACKGROUND INFORMATION

Repeaters are commonly used in fiber optic systems to amplify optical signals being transmitted over long distances. A repeater body is coupled to a fiber optic cable at each end. The repeater body houses electronic circuitry and lasers used to amplify the optical signals. Lasers and electronics housed in the repeater body should be maintained under very dry conditions, because the slightest amount of condensation in the repeater can cause arcing. Arcing can be devastating to the operation of the system. Maintaining these very dry conditions is most important in undersea applications but also applies as well to terrestrial applications.

To achieve these dry conditions, prior to installation, the repeater housing is vacuum drawn and the air is replaced with pressurized nitrogen to prevent moisture from entering the repeater housing. To enable the repeater housing to maintain the pressurized nitrogen, it is conventional to route optical fibers entering and exiting the repeater through a seal. One known system for creating the seal includes routing the fibers through a plastic tube on the outside of the repeater housing. A compressible rubber stopper is then inserted in one end of the plastic tube to seal the end of the plastic tube. The rubber stopper is punctured one hole at a time for each optical fiber in the bundle and each fiber is routed through a respective hole during the puncturing process. The compressible nature of the rubber stopper is intended to create an individual seal with each optical fiber. At least one drawback of this conventional seal and sealing method is that the assembly is labor intensive.

Additionally, this type of sealing assembly is better suited for water blockage. Because the sealing assembly relies on a friction fit between the rubber stopper and the plastic tube and fibers, the nitrogen in the pressurized housing interior could still potentially escape through the seal if tight tolerances are not achieved. Furthermore, this existing sealing assembly had difficulty accepting more than eight fibers due to the inherent material properties of the rubber stopper and the difficulty in drawing the fiber through the rubber. This sealing assembly thus could not easily accommodate the increased number of fibers in high fiber count cables.

Accordingly, there is a need for a gas blocking device that is easier to install, that has improved sealing properties, and that is capable of accommodating an increased number of fibers.

SUMMARY OF THE INVENTION

In accordance with the present invention, an optical fiber device is provided. The optical fiber device comprises a housing that is vacuum drawn and pressurized with a gas to prevent moisture from entering the housing. An optical fiber holding tube extends through a wall in the housing such that a first end of the optical fiber holding tube is contained in the housing and a second end of the tube is located outside the housing. A plurality of optical fibers extends from the first end of the optical fiber holding tube to the second end of the optical fiber holding tube without interruption. A gas blocking device is attached to the first end of the optical fiber holding tube. The optical fibers extend through the gas blocking device and are surrounded by a material, creating a seal that prevents the gas from passing through the optical fiber holding tube.

In accordance with another aspect of the present invention, a gas blocking device is provided for use with an optical fiber holding tube. The gas blocking device comprises a fiber containing body having a passageway for receiving a plurality of fibers from the optical fiber holding tube. A material, such as hot melt glue, at least partially fills the passageway of the fiber containing body and surrounds the plurality of fibers passing through the passageway. A fiber organizing insert is secured at one end of the fiber containing body and has a plurality of fiber receiving holes for receiving respective ones of the plurality of fibers. The fiber organizing insert and the fiber containing body preferably include cooperating key structures such that the fiber organizing insert is prevented from rotating with respect to the fiber containing body. A locking member preferably secures the fiber organizing insert to the one end of the fiber containing body.

In one embodiment, the passageway within the fiber containing body includes a wide portion, a narrow portion, and a tapered portion between the narrow portion and the wide portion. The narrow portion of the passageway preferably has an inside diameter dimensioned such that the fibers act as strength members within the material in the narrow portion. For example, the ratio of the cross-sectional area of the fibers to the cross-sectional area of the narrow portion is about ½. The fiber organizing insert is secured within the wide portion of the passageway and is preferably made of a substantially non-compressible material.

In accordance with a further aspect of the present invention, the gas blocking device is provided as an assembly comprising the fiber containing body for receiving the fibers and the material, the fiber organizing insert adapted to be positioned at one end of the fiber containing body, and the locking member adapted to lock the fiber organizing insert to the fiber containing body.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
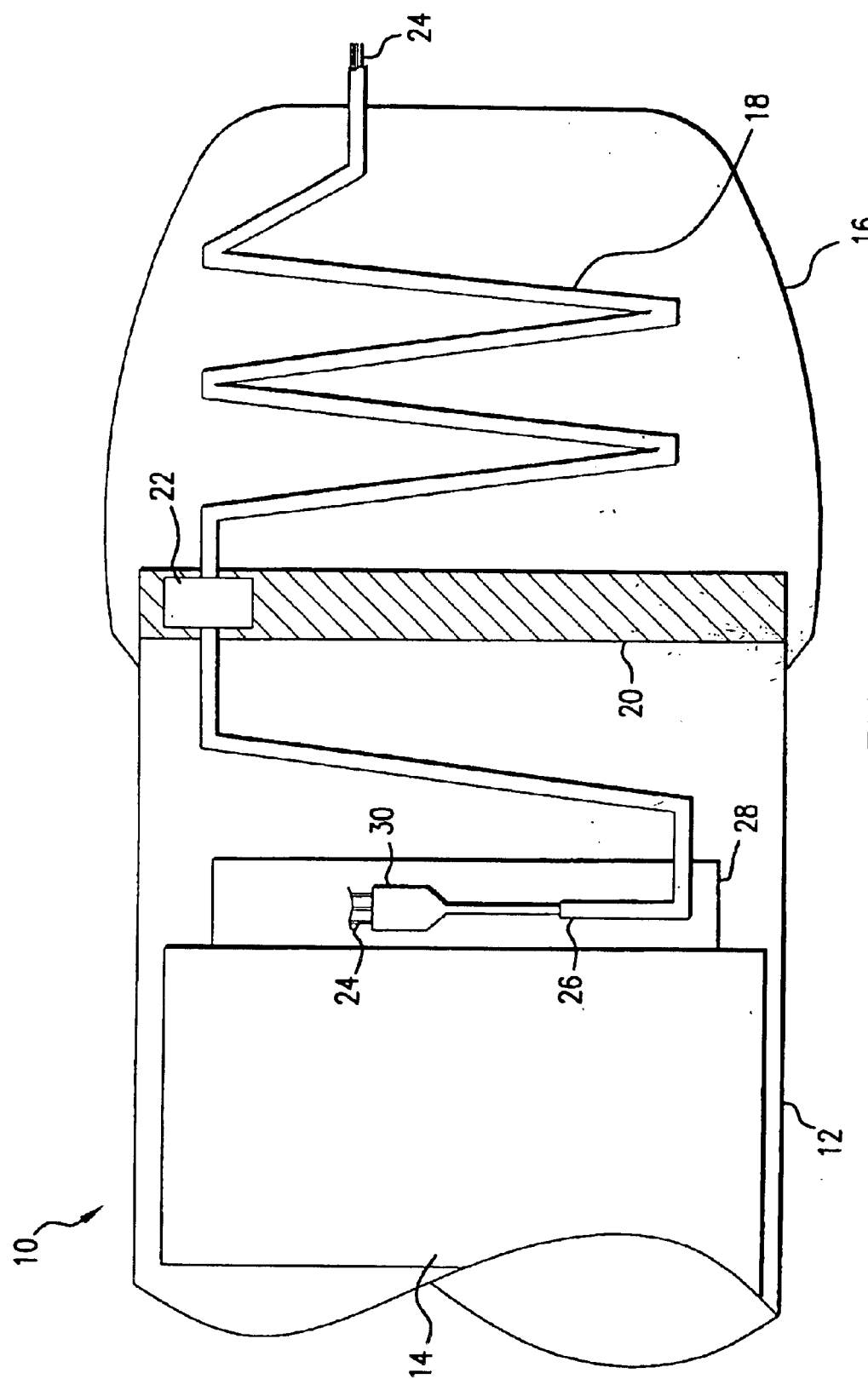
FIG. 1 is a schematic view of one end of a repeater, including a gas blocking device according to one embodiment of the present invention.

The gas blocking device 30, FIG. 1, according to the present invention, is used to substantially prevent or block the passage of gas while allowing optical fibers to pass through. According to the exemplary embodiment, the gas blocking device 30 is used in an optical fiber repeater 10. The gas blocking device 30 may also be used in other devices that house optical fibers, such as a joint box.

The repeater 10 receives, amplifies, and retransmits signals being carried by a fiber optic cable. Repeater 10 includes a repeater housing 12 containing a signal processing and routing system 14 having a laser (not shown). An end cover or wall 20 covers the end of the repeater housing 12, and a cone 16 encloses the end of the repeater housing 12. An optical fiber holding tube 18, sometimes referred to as a pigtail, extends from inside the repeater housing 12 through the end cover 20 and out of the cone 16. A tube seal 22 is incorporated where the fiber holding tube 18 extends through the end cover 20 to make the repeater housing 12 water tight in that area.

A cable structure (not shown) is connected to the cone 16, and optical fibers 24 extend from the cable structure through the optical fiber holding tube 18 to carry signals to and/or from the repeater 10. The fibers 24 exit the end 26 of the optical fiber holding tube 18 within a fiber tray 28 inside the repeater housing 12 and are coupled in a known manner to the signal processing and routing system 14. A similar arrangement exists at the other end of the repeater 10. This enables the signals transmitted by the fibers 24 to one end of the repeater 10 to be received, amplified and retransmitted to the fibers 24 at the other end of the repeater 10.

To prevent moisture or condensation from entering the repeater housing 12, the repeater housing 12 is vacuum drawn and the air is replaced with pressurized nitrogen or another suitable gas. The repeater housing 12 is typically pressurized to about 30 to 35 psi. The gas blocking device 30 is attached to the end 26 of the optical fiber holding tube 18 inside of the repeater housing 12 and prevents the pressurized gas from exiting the repeater 10 through the optical fiber holding tube 18. The gas blocking device 30 also prevents gas from entering the repeater 10 through the fiber holding tube 18.

Figure 2:
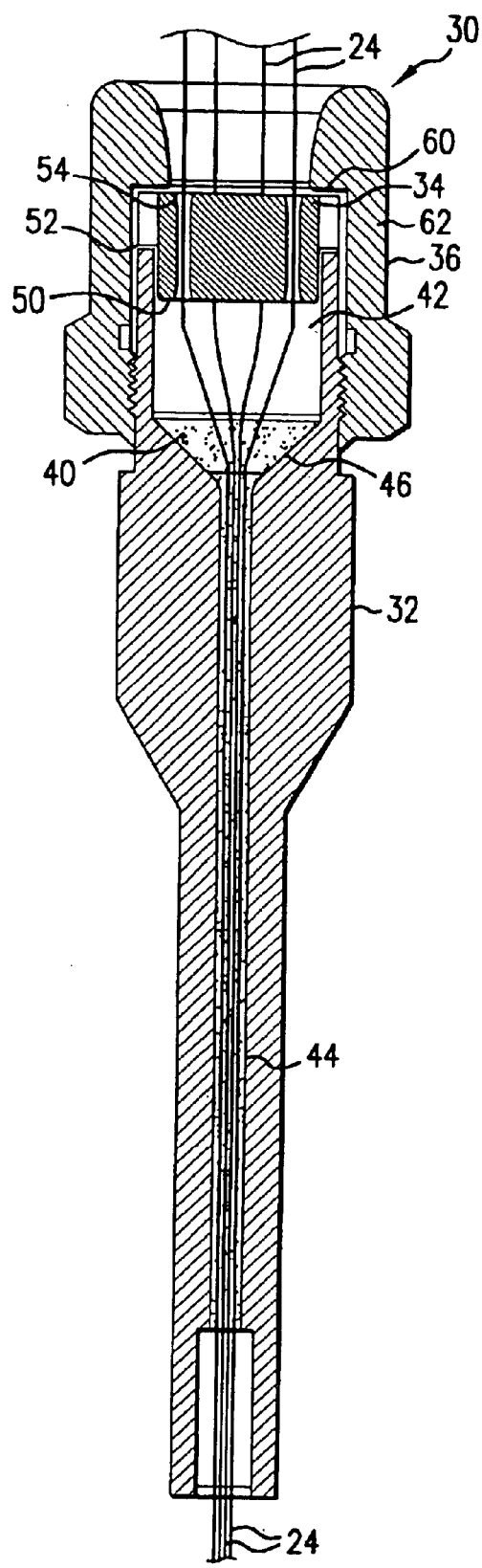
FIG. 2 is a cross-sectional view of the gas blocking device including fibers and material, according to one embodiment of the present invention
Figure 3:
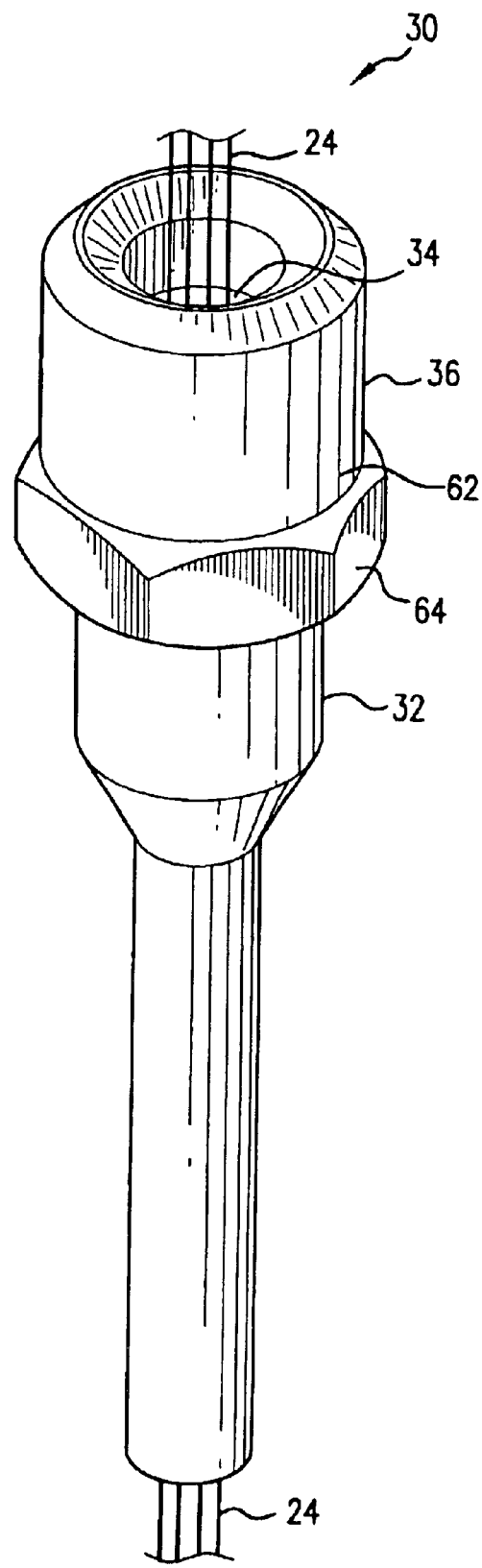
FIG. 3 is a perspective view of the gas blocking device shown in FIG. 2.

According to one embodiment, the gas blocking device 30, FIGS. 2 and 3, includes an elongated fiber containing body 32, a fiber organizing insert 34, and a locking member 36. The fibers 24 extend through the fiber organizing insert 34 into a passageway through the body 32 at one end and pass out of the body 32 through the opposite end. The locking member 36 secures the fiber organizing insert 34 to the body 32. A material 40, such as hot melt glue, surrounds the fibers 24 within the body 32 and seals the passageway around the fibers 24, thereby preventing gas from passing through the body 32. Hot melt glue has the preferred capability of being re-heated and softened to allow adjustment of the fibers 24 within the body 32 as needed. Other types of material, such as epoxy or other adhesives, may also be used.

In one embodiment, the passageway in the fiber containing body 32 includes a wide portion 42, a narrow portion 44, and a tapered portion 46 therebetween. The wide portion 42 and tapered portion 46 allow the material or adhesive 40 to flow into the narrow portion 44 of the passageway where the sealing takes place. The fibers 24 preferably act as strength members within the material 40 similar to the manner in which steel is used to reinforce concrete. For example, when the gas blocking device 30 is frozen, the fibers 24 hold the adhesive 40 together and prevent the adhesive 40 from cracking. To allow the fibers 24 to act as strength members and provide this reinforcement, the narrow portion 44 of the passageway should not be too wide. The narrow portion 44 preferably has an inside diameter just large enough to receive the fibers 24 and to allow the material or adhesive 40 to flow into the narrow portion 44 and seal the fibers 24. The ratio of the cross-sectional area of the fibers 24 to the cross-sectional area of the narrow portion 44 is preferably about ½. In one example, the narrow portion 44 may have an inside diameter of about 1/16 in. This size is capable of accommodating about 16 to 24 fibers 24. Although only four fibers 24 are shown in FIGS. 2 and 3 for purposes of clarity, it is contemplated that multiple fibers may be used, for example 16 to 24 fibers or perhaps even more.

The adhesive 40 preferably fills at least substantially the entire length of the narrow portion 44 of the passageway. The narrow portion 44 preferably has a minimum length sufficient for pressure sealing purposes. In the exemplary embodiment, the length of the narrow portion 44 is about 1.5 in. Although the exemplary embodiment is shown with a specific shape, the fiber containing body 32 can have other shapes, sizes and configurations.

Figure 4:
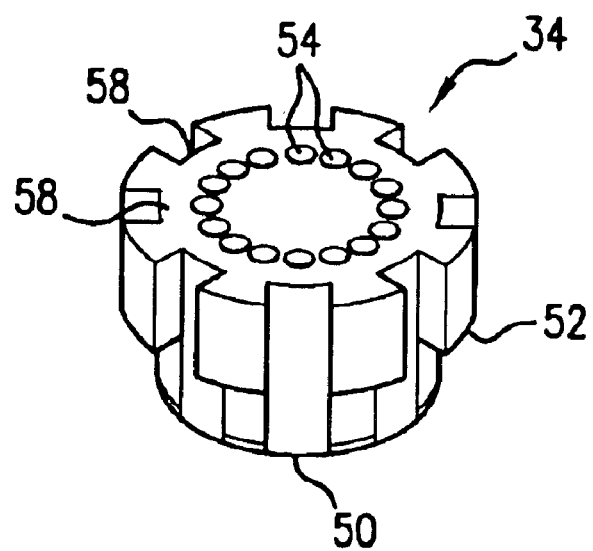
FIG. 4 is a perspective view of the fiber organizing insert, according to one embodiment of the present invention.

According to one preferred embodiment, the fiber organizing insert 34, FIG. 4, has a center plug 50 and a seating flange 52 that seats the fiber organizing insert 34 relative to the fiber containing body 32 (FIG. 2). The fiber organizing insert 34 includes preformed fiber receiving holes 54 through which the individual optical fibers 24 extend and enter into the fiber containing body 32. Although the exemplary embodiment shows the holes 54 arranged as a single circle, the preformed fiber receiving holes 54 can be arranged in two or more concentric circles to accommodate additional fiber 24.

The fiber organizing insert 34 is preferably made of a rigid, substantially non-compressible material, such as plastic, that will not scratch or damage the fibers and will withstand being heated and frozen. The fiber organizing insert 34 is thus capable of accommodating more fibers than the compressible rubber stoppers used in the conventional sealing devices. Although plastic is used in the exemplary embodiment, other suitable materials may also be used. The fiber organizing insert 34 may also have other shapes, sizes and configurations.

The fiber organizing insert 34 engages the fiber containing body 32 such that the seating flange 52 is seated at the end of the fiber containing body 32 and the center plug 50 extends into the wide portion 42 (see FIG. 2). The fiber organizing insert 34 and the fiber containing body 32 preferably include cooperating key structures for preventing rotation of the fiber organizing insert 34 with respect to the fiber containing body 32. By preventing rotation when the fiber organizing insert 34 is engaged with the fiber containing body 32, the cooperating key structures prevent undesirable twisting of the fibers 24. The fiber organizing insert 34 thus organizes and restrains the fibers 24 to prevent microbending and other damage to the fibers 24.

Figure 5:
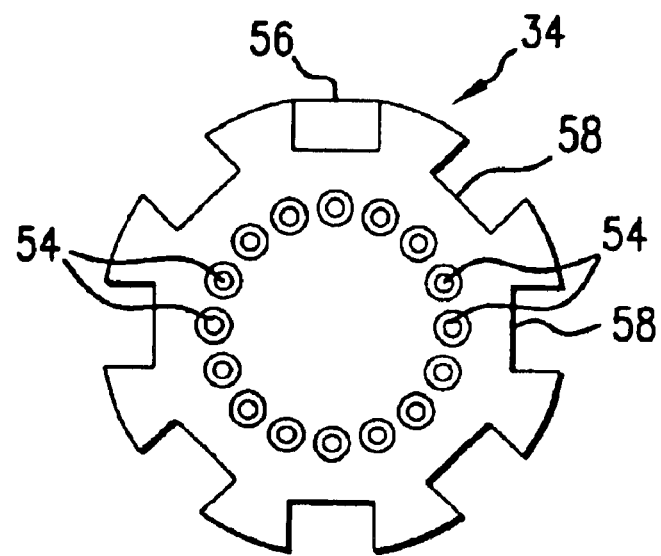
FIG. 5 is a top plan view of the fiber organizing insert shown in FIG. 4.
Figure 6:
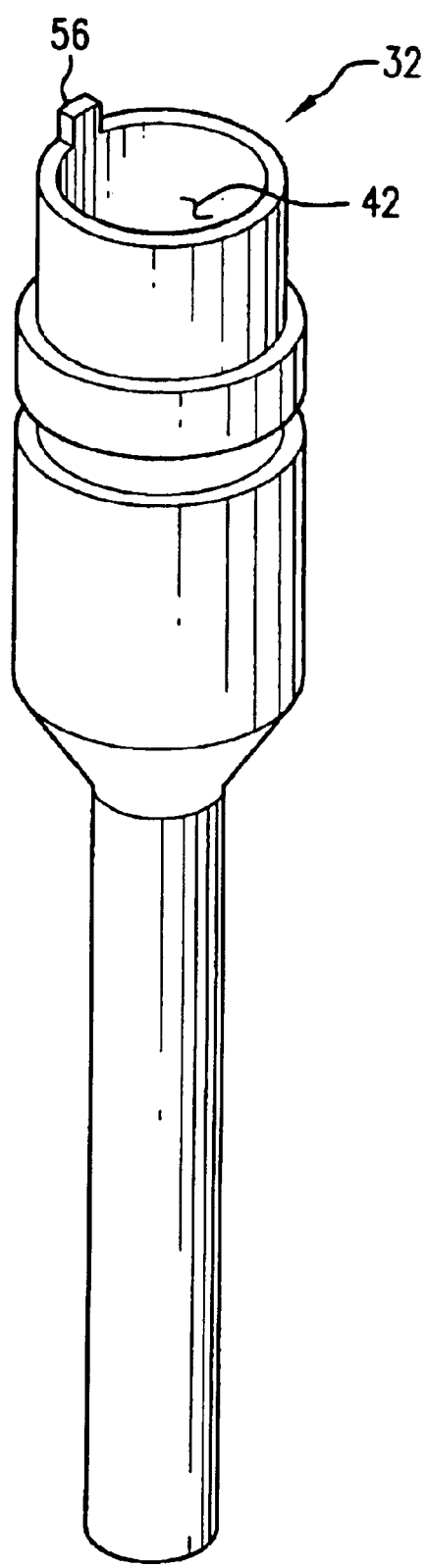
FIG. 6 is a perspective view of the fiber containing body used in the gas blocking device shown in FIG. 2.

According to the exemplary embodiment of the cooperating key structures, shown in FIG. 5, a locking key 56 on the fiber containing body 32 engages a locking recess 58 in the seating flange 52 of the fiber organizing insert 34. The locking key 56 preferably extends from the end of the fiber containing body 32, as shown in FIG. 6. The fiber organizing insert 34 preferably includes multiple locking recesses 58 to facilitate positioning of the fiber organizing insert 34.

Although one embodiment of the cooperating key structures is shown and described, any arrangement of cooperating key structures capable of preventing rotation may be used. For example, the fiber organizing insert 34 may include a single locking recess 58 or the fiber containing body may include multiple locking keys 56. Alternatively, the fiber organizing insert 34 may have keys or projections engaging recesses in the fiber containing body 32.

The fiber organizing insert 34 is secured against the fiber containing body 32 by the locking member 36 (see FIG. 2). The locking member 36 includes an inner extending flange 60 extending over the end of the body 32 and a base 62 extending around the outside of the body 32. The base 62 of the locking member 36 is secured to the fiber containing body 32, for example, by a threaded engagement. According to the exemplary embodiment, the base 62 has a shaped portion 64 (e.g., hexagonal) that may interface with a tool, such as a wrench. The locking member 36 may also be attached to the fiber containing body 32 in other ways. When the locking member 36 is secured to the body 32, the inner extending flange 60 bears against the fiber organizing insert 34 to effectively sandwich the fiber organizing insert 34 between the locking member 36 and the fiber containing body 32.

To assemble the gas blocking device 30, the fiber containing body 32 is secured to the end 26 of the fiber holding tube 18. The fiber containing body 32 and the fiber holding tube 18 are it both preferably made of copper and may be secured by soldering. Although copper is preferred because of its good conductability, other materials may also be used. The fibers 24 are inserted into the fiber organizing insert 34 and the fiber containing body 32. Each of the fibers 24 is inserted through one of the fiber receiving holes 54 in the fiber organizing insert 34.

With the fiber organizing insert 34 positioned just above the locking key 56 of the fiber containing body 32, the hot melt glue (or other suitable adhesive) is injected into the fiber containing body 32 until the hot melt glue substantially fills the narrow portion 44. The fiber organizing insert 34 is then moved into place such that the locking key 56 engages one of the recesses 58. The locking member 36 is then positioned over the fiber organizing insert 34 and threaded onto the fiber containing body 32 to secure the fiber organizing insert 34 to the body 32. The fiber holding tube 18 with the gas blocking device 30 is then installed into the repeater housing 12 with the gas blocking device 30 and fibers 24 exiting the gas blocking device 30 being stowed in the fiber tray 28.

Accordingly, the gas blocking device of the present invention is relatively easy to install and is more effective at blocking gas compared to conventional sealing devices.

Modifications and substitutions by one of ordinary skill in the art are considered to be within the scope of the present invention, which is not to be limited except by the claims that follow.

What is claimed is:

1. An optical fiber device comprising:
   a housing having a wall, wherein said housing is vacuum drawn and pressurized with a gas to prevent moisture from entering said housing;
   an optical fiber holding tube extending through said wall and having a first end and a second end, said first end of said optical fiber holding tube contained in said housing and said second end of said optical fiber holding tube located outside of said housing;
   a plurality of optical fibers extending from said first end of said optical fiber holding tube to said second end of said optical fiber holding tube without interruption; and
   a gas blocking device attached to said first end of said optical fiber holding tube, wherein said gas blocking device comprises:
   a fiber containing body having a passageway, said passageway including a wide portion and a narrow portion, wherein said optical fibers extend through said passageway in said fiber containing body of said gas blocking device; and
   a sealing material contained in said passageway and hardened around said optical fibers within said passageway such that said gas blocking device creates a seal substantially preventing gas from passing through said optical fiber holding tube, and wherein said plurality of optical fibers act as strength members that reinforce said sealing material within at least said narrow portion of said passageway.

2. The optical fiber device according to claim 1, wherein said gas is nitrogen.

3. The optical fiber device according to claim 1, further including a water seal sealing an interface between said wall and said optical fiber holding tube extending through said wall.

4. The optical fiber device according to claim 1 wherein said gas blocking device includes:
   a fiber organizing insert secured within said wide portion of said passageway at one end of said fiber containing body such that said fiber organizing insert is prevented from rotating with respect to said fiber containing body, wherein said fiber organizing insert includes a plurality of fiber receiving holes each receiving respective ones of said plurality of fibers.

5. The optical fiber device according to claim 4, further including a locking member securing said fiber organizing insert to said one end of said fiber containing body.

6. The optical fiber device according to claim 4, wherein said passageway in said fiber containing body includes a tapered portion between said wide portion and said narrow portion.

7. The optical fiber device according to claim 4, wherein said fiber organizing insert is made of a substantially non-compressible material.

8. The optical fiber device according to claim 4, wherein said fiber containing body and said fiber holding tube are made of a conductive metal and are soldered together.

9. The optical fiber device according to claim 1, wherein said sealing material is hot melt glue.

10. The optical fiber device according to claim 1 wherein the ratio of the cross-sectional area of said fibers to the cross-sectional area of said narrow portion is about ½.

11. A method of passing optical fibers into a pressurized housing, said method comprising the steps of:
   securing a gas blocking device to one cud of an optical fiber holding tube;
   inserting a plurality of optical fibers through said optical fiber holding tube and through said gas blocking device;
   injecting a sealing material into said gas blocking device, wherein said sealing material surrounds said optical fibers and hardens such that said optical fibers act as strength members reinforcing said sealing material and such that said material creates a seal substantially preventing gas from passing through said optical fiber holding tube; and
   installing said optical fiber holding tube and said gas blocking device into said housing such that said fibers exit said gas blocking device into said housing.

12. The method of claim 11 wherein the stop of injecting said sealing material includes injecting an adhesive.

13. The method of claim 11 wherein the step of injecting said sealing material includes injecting a hot melt glue.

14. The method of claim 11 further comprising the steps of:

inserting each of said optical fibers through a hole in a fiber organizing insert; and securing said fiber organizing insert to said gas blocking device.

* * * * *